(12) United States Patent
Lehmann

(10) Patent No.: US 9,071,099 B2
(45) Date of Patent: Jun. 30, 2015

(54) FAN UNIT

(75) Inventor: Ralf Lehmann, Oberkirch (DE)

(73) Assignee: Robert Bosch GmbH, Stuttgart (DE)

( * ) Notice: Subject to any disclaimer, the term of this patent is extended or adjusted under 35 U.S.C. 154(b) by 236 days.

(21) Appl. No.: 13/390,783

(22) PCT Filed: Jul. 27, 2010

(86) PCT No.: PCT/EP2010/060837
§ 371 (c)(1),
(2), (4) Date: Apr. 27, 2012

(87) PCT Pub. No.: WO2011/023477
PCT Pub. Date: Mar. 3, 2011

(65) Prior Publication Data
US 2012/0207631 A1    Aug. 16, 2012

(30) Foreign Application Priority Data

Aug. 26, 2009  (DE) .......................... 10 2009 028 887
Jan. 29, 2010   (DE) .......................... 10 2010 001 354

(51) Int. Cl.
| | |
|---|---|
| H02K 5/20 | (2006.01) |
| F04D 25/06 | (2006.01) |
| F04D 25/08 | (2006.01) |
| H02K 9/06 | (2006.01) |
| H02K 5/18 | (2006.01) |
| H02K 7/14 | (2006.01) |

(52) U.S. Cl.
CPC .............. *H02K 5/20* (2013.01); *F04D 25/0613* (2013.01); *F04D 25/082* (2013.01); *H02K 5/18* (2013.01); *H02K 7/14* (2013.01); *H02K 9/06* (2013.01)

(58) Field of Classification Search
CPC .............. F04D 25/082; F04D 25/0613; H05K 7/20172; H02K 9/06; H02K 1/32
USPC ............ 417/423.1, 423.8; 310/52, 58, 59, 64; 415/116, 177, 180
See application file for complete search history.

(56) References Cited

U.S. PATENT DOCUMENTS

| | | |
|---|---|---|
| 5,944,497 A | 8/1999 | Kershaw et al. |
| 6,384,494 B1 | 5/2002 | Avidano et al. |
| 6,887,039 B2 * | 5/2005 | Soechting et al. ......... 415/174.4 |

(Continued)

FOREIGN PATENT DOCUMENTS

| | | |
|---|---|---|
| EP | 1622244 | 2/2006 |
| JP | 2005069070 | 3/2005 |
| JP | 2006180617 | 7/2006 |

OTHER PUBLICATIONS

PCT/EP2010/060837 International Search Report dated Aug. 3, 2011 (3 pages).

*Primary Examiner* — Devon Kramer
*Assistant Examiner* — Patrick Hamo
(74) *Attorney, Agent, or Firm* — Michael Best & Friedrich LLP

(57) ABSTRACT

The invention relates to a blower (99), in particular for an engine cooling blower in a motor vehicle, comprising a housing (10) having a cooling air guide device (200), wherein the housing (10) is designed for mounting a drive unit (102, 103) and the cooling air guide device (200) in the motor vehicle, and for guiding a cooling air flow (20, 30, 31, 32) to the drive unit (102, 103), wherein the cooling air guide device (200) is designed as one piece with the housing (10).

13 Claims, 4 Drawing Sheets

(56) References Cited

U.S. PATENT DOCUMENTS

| | | |
|---|---|---|
| 7,923,871 B2 | 4/2011 | Weiss |
| 2004/0257764 A1 | 12/2004 | Jang |
| 2007/0147995 A1 | 6/2007 | Araki |
| 2008/0084140 A1 | 4/2008 | Kim |
| 2008/0127671 A1 | 6/2008 | Kim et al. |
| 2008/0131274 A1 | 6/2008 | Kim et al. |
| 2008/0193275 A1 | 8/2008 | De Filippis et al. |
| 2008/0317586 A1 | 12/2008 | Kuma |

* cited by examiner

C - C

FAN UNIT

BACKGROUND OF THE INVENTION

The invention relates to a fan unit, particularly for an engine cooling fan in a motor vehicle, exhibiting a housing with a cooling air flow device, wherein the housing is designed to secure a drive unit and the cooling air flow device in the motor vehicle and to direct a cooling air flow at the drive unit.

Drives with an electric motor are known in the art, said motor exhibiting a housing with a rotor and a stator and a mounting for the rotor. The housing comprises a housing cover which is axially disposed on one side of the housing and closes off a housing interior. DE 10 2006 015 064 A1 proposes in this respect that a fan should be disposed at each front end of the rotor, wherein a cooling channel in the rotor is assigned to each segment of the fan, in order to convey cooling air into the rotor. This involves the air flow passing via several separately mounted components.

SUMMARY OF THE INVENTION

The problem addressed by the invention is that of providing a fan unit with an improved cooling air flow.

It was recognized in the invention that the cooling air flow in a fan unit can be improved by making the housing integral with a cooling air flow device, which directs a cooling air flow at a drive unit.

On account of the integral design, as compared with a customary multi-piece embodiment, the housing can be simply and quickly mounted along with the cooling air flow device during assembly of the fan unit.

In a further embodiment of the invention, the cooling air flow device exhibits at least one cooling fin and a deflecting mechanism, wherein the cooling fin is designed to guide the longitudinal direction of the cooling air flow and the deflecting mechanism is designed to determine the transverse direction of the cooling air flow, wherein the cooling fin is designed integrally with the deflecting mechanism. This has the advantage that there are no gaps between the cooling fin and the deflecting mechanism through which the cooling air can pass, so that leakage losses in the cooling air flow mechanism are reduced.

In a further embodiment of the invention, the cooling fin exhibits a horizontal cooling fin section, which is inclined in the alignment of its longitudinal axis, in order to provide the cooling air flow with a swirl effect. The advantage of this is that the rotating cooling air flow exhibits a greater cooling effect at the surface of the housing over which the flow passes.

In a further embodiment of the invention, the cooling fins are disposed at least peripherally on the housing, wherein the deflecting mechanism is disposed in an end section of the cooling fin, in order to direct the cooling air flow at the interior of the housing. The advantage of this is that the cooling air flow passes over a greater radiating surface for the dissipation of heat.

In a further embodiment of the invention, the housing is produced along with the cooling air flow device by die-casting. The advantage of this is that the housing and the cooling air flow device can be produced together cost-effectively.

BRIEF DESCRIPTION OF THE DRAWINGS

The invention is described in greater detail below with the help of drawings. In these.

DETAILED DESCRIPTION

Figure 1:
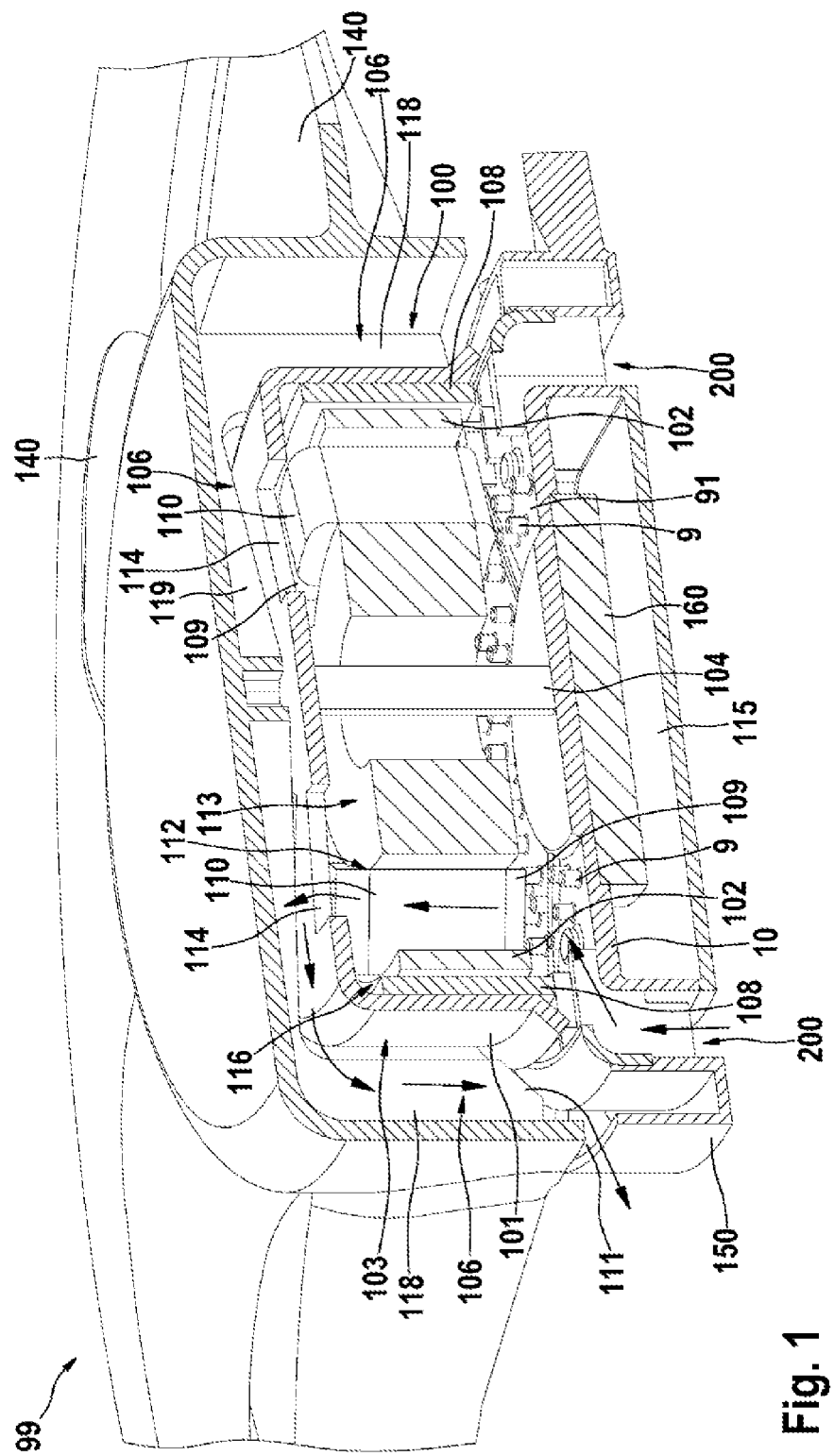
FIG. 1 shows a schematic 3D representation of a fan unit for an engine cooling system with a housing according to a first embodiment.

FIG. 1 shows a schematic 3D representation of a fan unit 99 for an engine cooling system with a housing 10 according to a first embodiment. The fan unit 99 comprises an electric motor 100 to drive a cooling fan 140 in a motor vehicle. The electric motor 100 in this case exhibits a stator 102 and a rotor 103 as the drive unit, which is disposed on the rotor shaft 104. The electric motor 100 has a brushless design as the external rotor. In this case the windings 110 used to generate an alternating magnetic field are disposed on the stator 102. The magnets 108 moving in the alternating magnetic field are disposed on the inner peripheral surface of a yoke housing 101 of the rotor 103. In addition, a fan 106 is disposed on the outside of the yoke housing 101. The fan 106 exhibits fins 118 disposed peripherally and also radially disposed fins 119 on the end face. The cylindrical yoke housing 101 is closed off at one front end by the housing 10, wherein a control unit 160 may be disposed on the housing 10 opposite the drive unit. In this case, the housing 10 with the control unit 160 may be closed by means of a housing cover 115. The housing 10 optionally exhibits a multiplicity of cooling studs 9 on a surface 91 of the end face turned towards the electric motor 100. In addition, several cooling air flow devices 200 are disposed integrally with the housing 10, ventilating an interior space 113 of the electric motor 100. On the periphery, the cooling air flow device 200 of the housing 10 is surrounded by a frame 150, which serves to secure the fan unit 99. There is a gap 111 between the fan 106 and the frame 150.

In order to eliminate the waste heat produced during running from the electric motor 100 and the control unit 160, the fan 106 is designed to convey cooling air through the housing 10 into the interior space 113 of the electric motor 100. In this case, the fan 106 is designed to convey the cooling air particularly to temperature-critical points of the drive unit, for example the windings 110 of the stator 102 and the magnets 108. In order to eliminate heat, the stator 102 has a multiplicity of through-holes 109, through which the cooling air is conveyed through the stator. In addition, the yoke housing 101 exhibits a multiplicity of openings, through which the cooling air leaves the yoke housing 101.

In order to supply the electric motor 100 with cooling air while running, the fan 106 draws in cooling air by creating negative pressure in the interior space 113 through the cooling air flow device 200. The cooling air flow device 200 deflects the flow direction of the cooling air into an inner area 112 of the electric motor 100. This involves the cooling air flowing around the cooling studs 9 before it flows in the direction of the windings 110 of the stator 102. The cooling air passes through the stator 102 via the through-holes 109 and leaves the interior space 113 of the yoke housing 101 via the openings 114 on the front end of the yoke housing 101 and enters the area of the radial fins 119 of the fan 106. The cooling air is conveyed radially outward by the radial fins 119, wherein the fins 118 disposed peripherally convey the cooling air to the gap 111. The fan 106 conveys the heated cooling air through the gap 111 between the fan 106 and the frame 150 out of the electric motor 100. The creation of negative pressure in the interior space 113 takes place essentially in the area of the fins 119 disposed radially on the front end of the yoke housing 101. However, other types of design for the fan 106 are also conceivable, axial fans, for example.

Figure 2:
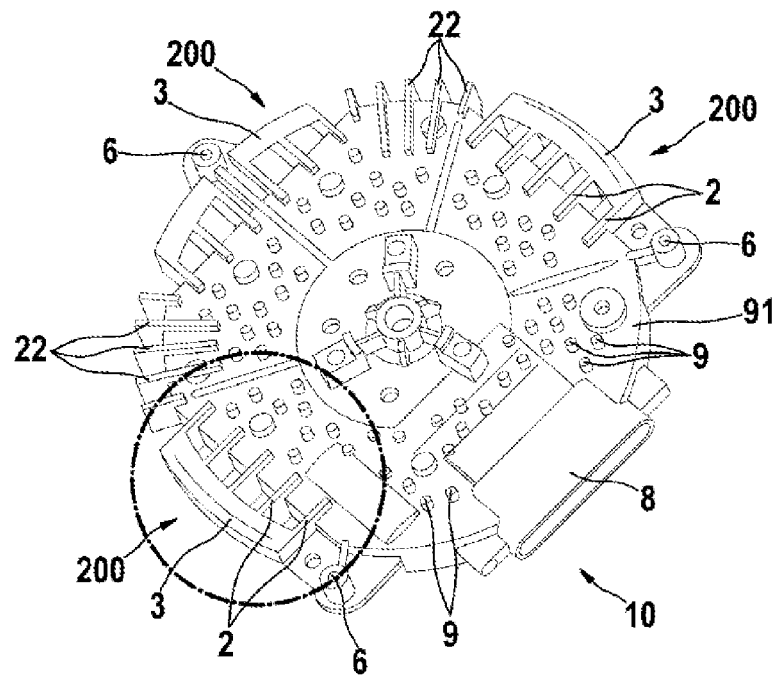
FIG. 2 shows a schematic 3D view of the housing shown in FIG. 1.

FIG. 2 shows a schematic 3D representation of the housing 10 shown in FIG. 1. In this case the same components are identified below using the same reference numbers. A circle is used to mark a section of the housing 10 and of the cooling air flow device 200, in order to show this in two different embodiments in FIG. 3 and FIG. 6. For a clearer depiction of the cooling air flow device 200, the remaining components of the electric motor 100 are not shown.

The housing 10 has a connection 8 for the supply of electricity to the electric motor 100. The housing 10 is roughly cup-shaped and several cooling air flow devices 200 are disposed on its periphery. The housing 10 optionally exhibits several cooling studs 9 on its end surface, which project from the surface 91 of the housing 10. Between the individual cooling air flow devices 200, several first cooling fins 22 are also disposed, which run along at least part of the periphery of the housing 10 and along the surface 91 of the housing 10, depending on the type of design.

The cooling air flow device 200 has a multiplicity of second cooling fins 2 and a deflecting mechanism 3. On the cooling air flow device 200 there is furthermore a fixing opening 6 for the screw-attachment of the housing 10 to the frame 150. The cooling air flow devices 200 are disposed offset at an angle of roughly 90°. However, they may also be disposed in accordance with another cooling air requirement. The angle offset enables cooling air to flow over large parts of the surface 91 of the housing 10.

The fan 106 shown in FIG. 1 is driven by the rotor 103 and is designed to produce negative pressure in an interior space 113 of the electric motor 100. Cooling air is thereby drawn via the cooling air flow device 200 and along the first cooling fins 22 into the interior space 113 of the electric motor 100. In this case, the cooling air flows along the first cooling fins 22 into the yoke housing and straight into one of the external radial areas 116 of the rotor 103 shown in FIG. 1, without any significant deflection, so that the magnets 108 are cooled. The cooling air is likewise drawn in by the cooling air flow device 200, but the cooling air flow is not conveyed by the deflecting mechanism 3 to the rotor 103 without any significant deflection, as in the case of the first cooling fins 22, but its flow direction is deflected by roughly 50 to 80°, so that the inner areas 112 of the stator 102 are also thereby supplied with cooling air. To increase the area of the surface 91 of the housing 10, cooling studs 9 are disposed in the area of the cooling air circulation, which project into the cooling air flow, so that a greater amount of heat is thereby released by the heated housing 10 into the cooling air flow. The second cooling fins 2 of the cooling air flow device 200 also run in an area of the front of the surface 91 of the housing 10. This has the advantage that the deflected cooling air flow continues to be conveyed in its flow direction, in order to penetrate deeper into the inner areas 112 of the electric motor 100 close to the axis 104 of the rotor 103 and avoid creating a swirl effect in the cooling air flow.

The cooling air flow is usually guided by means of several components, which are disposed on the housing 10. Apart from the cost involved in assembling individual components, the multi-part design leads to gap losses and swirl effects, which can be avoided if the deflecting mechanism 3 of the cooling air flow device 200 is integral with the second cooling fins 2. In order to guarantee that the housing 10 has high thermal conductivity, the material used for the housing 10 is aluminum. The housing 10 may, however, exhibit other materials too, such as copper, iron, nickel, magnesium or plastic, in order to influence both the thermal conductivity and also the strength of the housing 10. The integral design means that the housing 10 can be produced cost-effectively along with the cooling air flow device by means of die-casting, compression-moulding or extrusion. Likewise, assembly of the electric motor 100 to the frame 150 along with the housing 10 is made easier.

Figure 3:
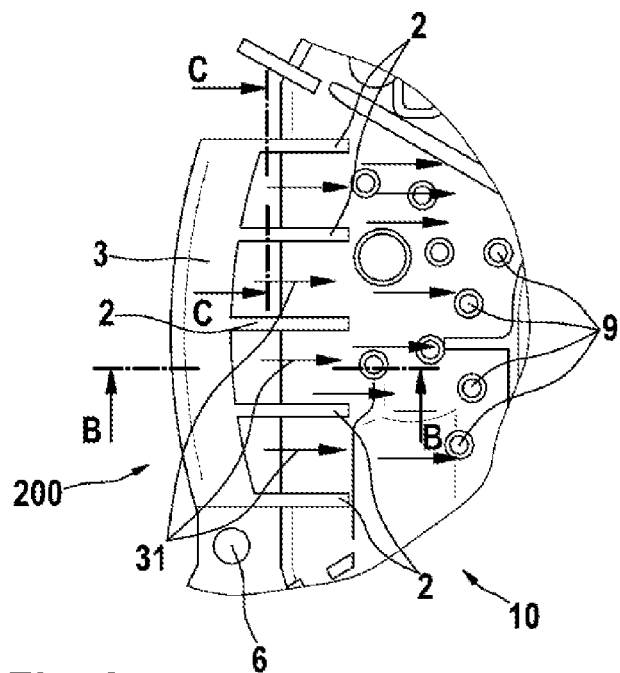
FIG. 3 shows a top view of a section of the housing shown in FIG. 2 according to a first embodiment.

FIG. 3 shows a top view of a section of the housing 10 shown in FIG. 2. The figure shows two sectional planes B-B and C-C standing perpendicular to one another. A cooling air flow 31 is thereby drawn in by the fan 106 shown in FIG. 1 through the cooling air flow device 200, wherein the cooling air flow 31 is deflected by the deflecting mechanism 3, so that the cooling air flow 31 passes over the front of the housing 10 and over the cooling studs 9. Since the second cooling fins 2 run parallel to one another, the cooling air flow 31 is guided through the deflecting mechanism 3 in its flow direction following the deflection, so that a swirl effect is avoided at the deflecting mechanism 3. The advantage of this is that the flow direction of the cooling air flow 31 can be determined simply and reliably. It would also be conceivable for the second cooling fins 2 to be fanned or inclined at the front end of the housing 10, in order to distribute the cooling air flow 31 accordingly over the surface 91 of the housing 10.

Figure 4:
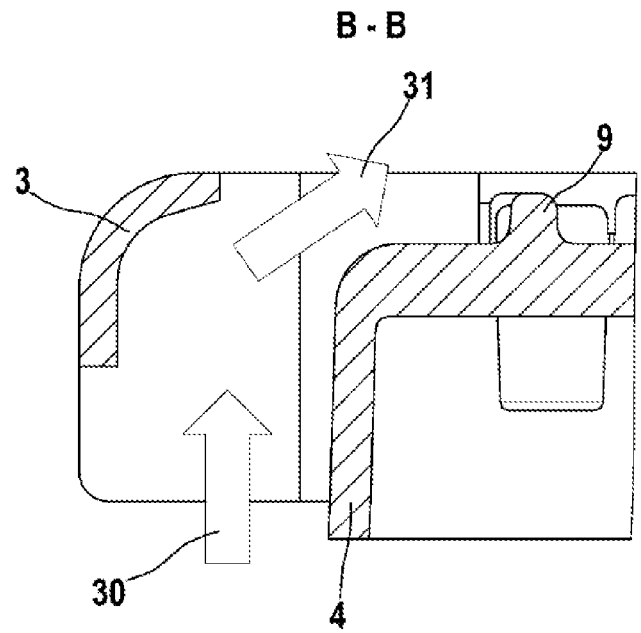
FIG. 4 and FIG. 5 show sectional views of the sectional planes shown in FIG. 3.
Figure 5:
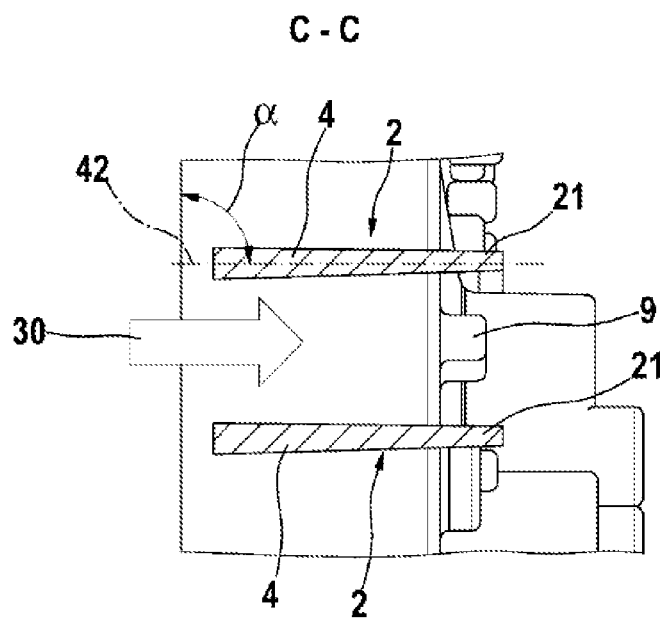

FIG. 4 and FIG. 5 show sectional views of the sectional planes B-B and C-C shown in FIG. 3. In this case, FIG. 4 shows a cross-section through the housing 10 along the sectional plane B-B and FIG. 5 shows a longitudinal section through the cooling air flow device 200 along the sectional plane C-C. An incoming cooling air flow 30 is guided in a longitudinal direction by a vertical cooling fin section 40 until the cooling air flow 30 is deflected by the deflecting mechanism 3, which is disposed in the end section of the cooling fin 2. The vertical cooling fin section 40 is also designed such that heat is emitted into the cooling air flow 30 as soon as it is sucked into the housing of the electric motor 100. Following the deflection of the cooling air flow 30 by the deflecting mechanism 3, the deflected cooling air flow 31 is guided by the horizontal cooling fin axis 42 of the cooling fin part 21 running perpendicular to the surface 91 of the housing 10. The same alignment of the horizontal cooling fin section 21 and the vertical cooling fin section 40 on one plane, as shown, causes a particularly low-swirl effect in the cooling air flow 30, 31.

Figure 6:
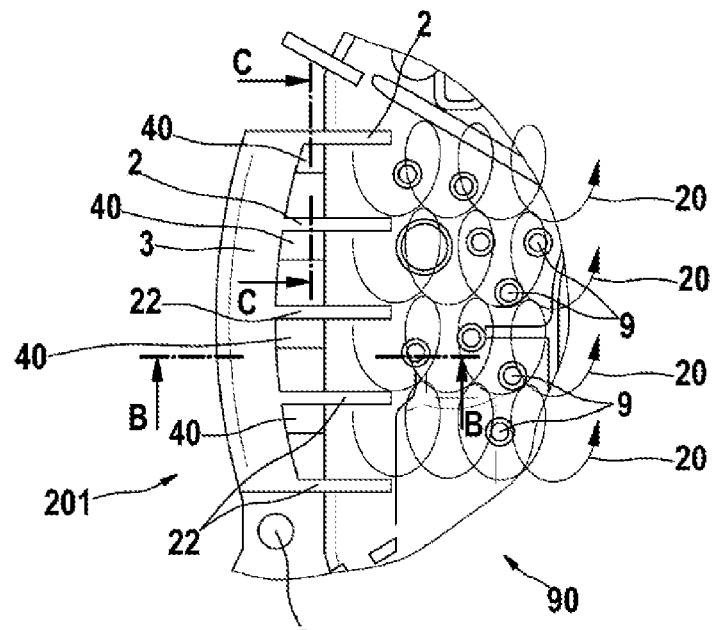
FIG. 6 shows a top view of a section of the housing shown in FIG. 2 according to a second embodiment.
Figure 7:
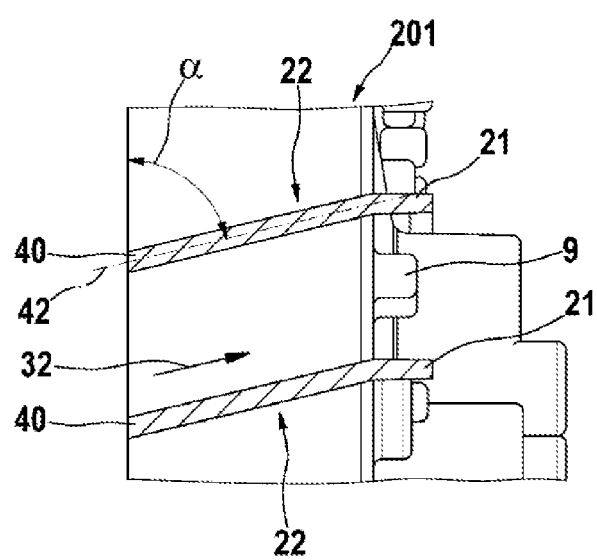
FIG. 7 shows a side view through the cooling air flow device shown in FIG. 6.

FIG. 6 shows a top view of a section of the housing 90 in accordance with a second embodiment. FIG. 7 shows a sectional view through a cooling air flow device 201 shown in FIG. 6 along the sectional plane C-C. In this case, a cooling fin axis 42 of a vertical cooling fin section 40 with a cooling fin 22 is inclined at angle α relative to the surface 91 of the housing 10. Unlike the embodiment shown in FIG. 3 to FIG. 5, the vertical cooling fin sections 40 are not perpendicular to the surface 91 of the housing 90. This means that the cooling air is no longer drawn through the cooling air flow device 201 parallel to the rotor axis 104 by the fan 106 in the electric motor 100, but instead suction takes place in this embodiment inclined at an angle α relative to the housing 10.

The horizontal cooling fin sections 21 also correspond in terms of their alignment to the configurations shown in FIG. 1 to FIG. 5 of the horizontal cooling fin sections 21. The incline of the vertical cooling fin sections 40 will provide a cooling air flow 32 with a swirl effect following deflection by the deflecting mechanism 3, so that a rotating cooling air flow 20 develops a greater cooling effect on the top 91 of the housing 90 or on the cooling studs 9. The desired rotation of the cooling air flow 32 is thereby defined by the incline of the vertical cooling fin sections 40. In this case, the rotation of the cooling air flow 32 is increased with a smaller angle α.

In order to produce the housing 90 by die-casting, the vertical cooling fin sections 40 can only be inclined at an angle α relative to the housing 90 insofar as the semicircular pieces needed for production are able to simulate the geometry of the vertical cooling fin sections.

The embodiments shown in FIG. 1 to FIG. 7 are also suitable, for example, for supplying the brush area of an electric motor with an adequate flow of cooling air. It is also conceivable for further components of a fan unit shown by way of example to be supplied with an adequate flow of cooling air, depending on the application involved.

What is claimed is:

1. A fan unit (99) for an engine cooling fan, the fan unit comprising a housing (10; 90) with a cooling air flow device (200; 201), wherein the housing (10; 90) is designed to secure a drive unit (102; 103) and the cooling air flow device (200; 201) and to direct a cooling air flow (20, 30, 31, 32) at the drive unit (102, 103), characterized in that the cooling air flow device (200; 201) is integral with the housing (10; 90) and comprises at least one cooling fin (2) and a deflecting mechanism (3), wherein the cooling fin (2) is designed to determine a longitudinal direction of the cooling air flow (20, 30, 31, 32), and the deflecting mechanism (3) is designed to determine a transverse, radially inwardly direction of the cooling air flow (20, 30, 31, 32), wherein the cooling fin (2) is integral with the deflecting mechanism (3), wherein the cooling fin (2) includes a horizontal cooling fin section (21) disposed along a top surface (91) of the housing (10), and a vertical cooling fin section (40) that extends radially outwardly from the housing (10), and wherein the deflecting mechanism (3) deflects and redirects the cooling air flow (20, 30, 31, 32) so as to cause the air flow (20, 30, 31, 32) to move in the transverse direction.

2. The fan unit (99) as claimed in claim 1, wherein the vertical cooling fin section (40) is inclined relative to a plane containing an axis of rotation of the drive unit (102; 103) in order to provide the cooling air flow (20, 30, 31, 32) with a swirl effect.

3. The fan unit (99) as claimed in claim 1, characterized in that the cooling fin (2) is disposed at least peripherally on the housing (10; 90), and wherein the deflecting mechanism (3) is disposed in an end section of the cooling fin (2).

4. The fan unit (99) as claimed in claim 1, characterized in that the cooling air flow device (200; 201) is designed to supply an inner area (112) of the housing with cooling air (20, 30, 31, 32).

5. The fan unit (99) as claimed in claim 1, characterized in that the housing (10; 90) may be produced along with the cooling air flow device (200; 201) by means of die-casting, extrusion or cast iron processing.

6. The fan unit (99) as claimed in claim 1, characterized in that the housing (10; 90) comprises at least one of aluminum, copper, magnesium and nickel.

7. The fan unit (99) as claimed in claim 1, characterized in that the drive unit (102, 103) comprises a rotor (103) and a stator (102) for an electric motor (100).

8. A fan unit (99) for an engine cooling fan, the fan unit comprising a housing (10; 90) with a cooling air flow device (200; 201), wherein the housing (10; 90) is designed to secure a drive unit (102; 103) and the cooling air flow device (200; 201) and to direct a cooling air flow (20, 30, 31, 32) at the drive unit (102, 103), characterized in that the cooling air flow device (200; 201) is integral with the housing (10; 90) and comprises at least one cooling fin (2) and a deflecting mechanism (3), wherein the cooling fin (2) is designed to determine a longitudinal direction of the cooling air flow (20, 30, 31, 32), and the deflecting mechanism (3) is designed to determine a transverse direction of the cooling air flow (20, 30, 31, 32), wherein the cooling fin (2) is non-planar, and is integral with the deflecting mechanism (3), characterized in that the cooling fin (2) comprises a horizontal cooling fin section (21) disposed along a top surface (91) of the housing (10), and a vertical cooling fin section (40) that extends radially outwardly from the housing (10), wherein the cooling fin (2) provides the cooling air flow (20, 30, 31, 32) with a swirl effect as the cooling air passes radially inwardly.

9. The fan unit (99) as claimed in claim 8, characterized in that the cooling fin (2) is disposed at least peripherally on the housing (10; 90), and wherein the deflecting mechanism (3) is disposed in an end section of the cooling fin (2).

10. The fan unit (99) as claimed in claim 8, characterized in that the cooling air flow device (200; 201) is designed to supply an inner area (112) of the housing with cooling air (20, 30, 31, 32).

11. The fan unit (99) as claimed in claim 8, characterized in that the housing (10; 90) may be produced along with the cooling air flow device (200; 201) by means of die-casting, extrusion or cast iron processing.

12. The fan unit (99) as claimed in claim 8, characterized in that the housing (10; 90) comprises at least one of aluminum, copper, magnesium and nickel.

13. The fan unit (99) as claimed in claim 8, characterized in that the drive unit (102, 103) comprises a rotor (103) and a stator (102) for an electric motor (100).

* * * * *